United States Patent [19]

Hiroshima

[11] Patent Number: 5,379,427
[45] Date of Patent: Jan. 3, 1995

[54] TASK TRACING APPARATUS IN A MULTITASK OPERATING SYSTEM

[75] Inventor: Ikuyoshi Hiroshima, Hyogo, Japan

[73] Assignee: Mitsubishi Denki Kabushiki Kaisha, Tokyo, Japan

[21] Appl. No.: 491,006

[22] Filed: Mar. 9, 1990

[30] Foreign Application Priority Data

Apr. 13, 1989 [JP] Japan .................................. 1-93709

[51] Int. Cl.[6] ............................ G06F 9/00; G06F 9/46
[52] U.S. Cl. ............................... 395/650; 364/DIG. 1; 364/281.3; 364/281.7
[58] Field of Search .................. 364/DIG. 1, DIG. 2, 364/281.3, 281.7; 395/650

[56] References Cited

U.S. PATENT DOCUMENTS 4,598,364  7/1986  Gum et al. ................... 364/200 X
4,809,170  2/1989  Leblang et al. ................ 364/200
4,845,615  7/1989  Blasciak ........................ 364/200

OTHER PUBLICATIONS

S. Sasaki, "Analyzing Multitask", 2nd ed., CQ Publications Inc., Tokyo, 1988 p. 48.

*Primary Examiner*—Kevin A. Kriess
*Assistant Examiner*—A. Katbab
*Attorney, Agent, or Firm*—Rothwell, Figg, Ernst & Kurz

[57] ABSTRACT

A task tracing apparatus stores causes and addresses of interruptions, and system call numbers and addresses of system calls issued by an ongoing task. This makes it possible to obtain not only the basic information about switches from one task to another, but also the other related and detailed information as needed. Thus the development of software systems is made easier and more efficient.

3 Claims, 7 Drawing Sheets

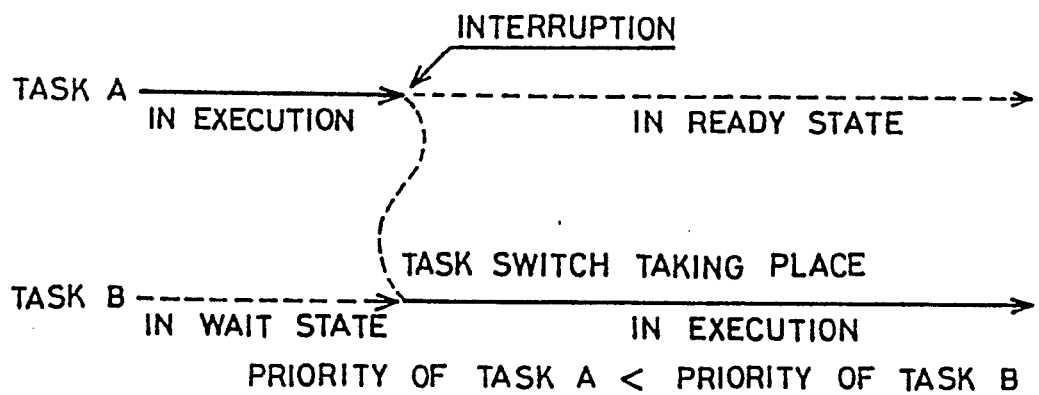
FIG. 4 (a) (PRIOR ART)
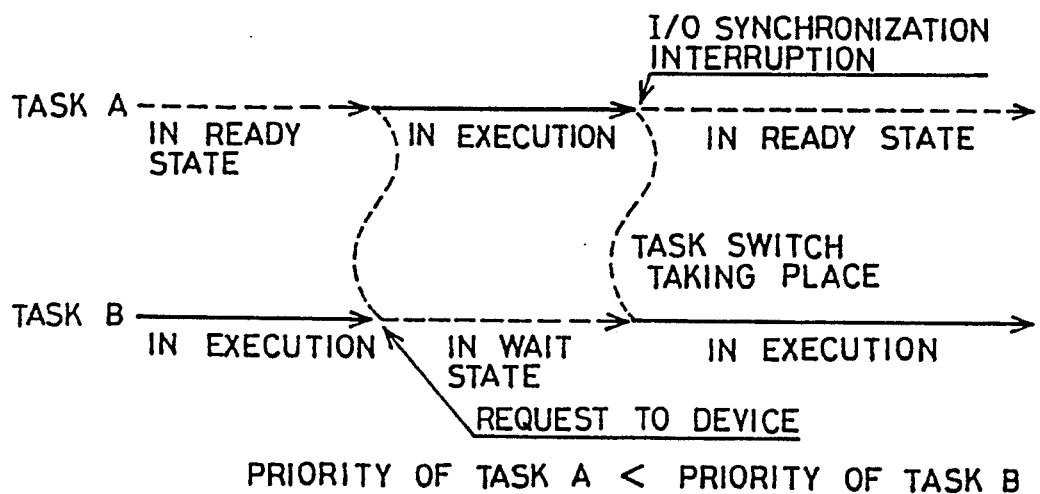
FIG. 4 (b) (PRIOR ART)
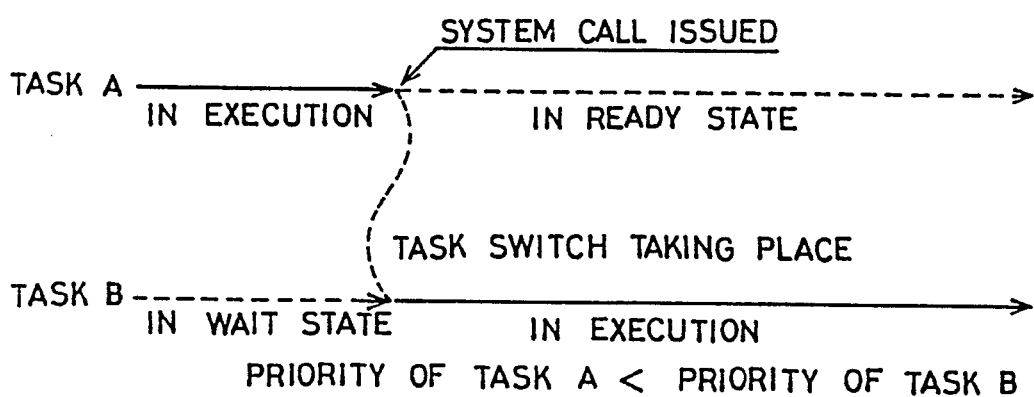
FIG. 4 (c) (PRIOR ART)

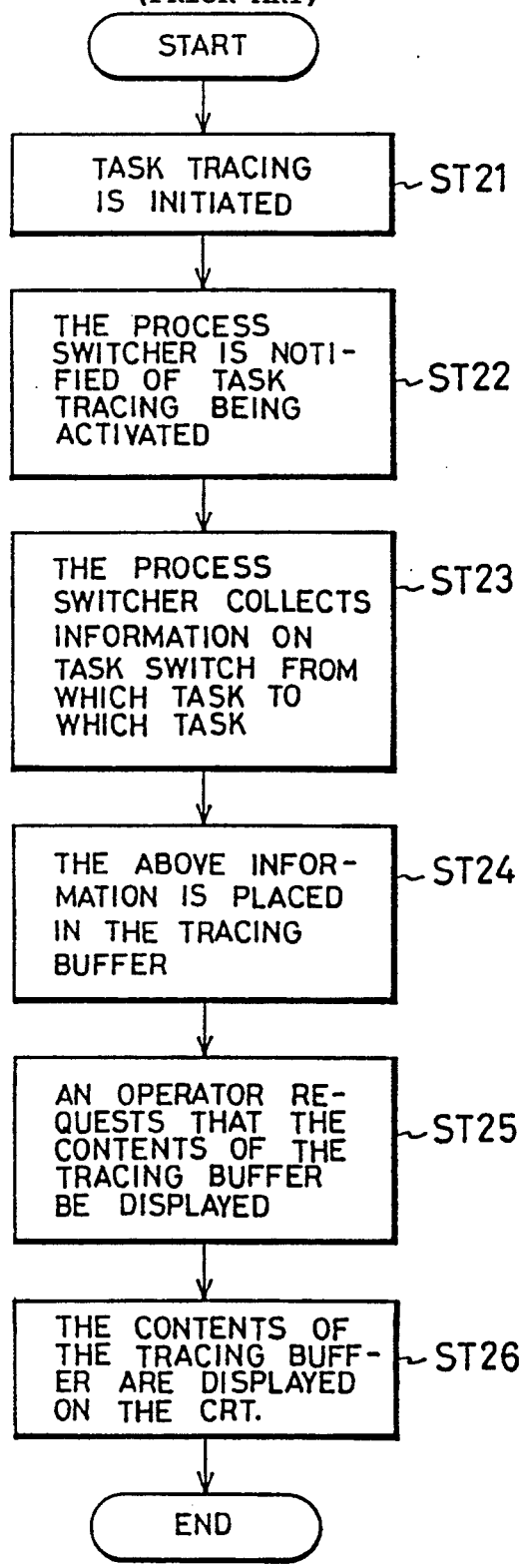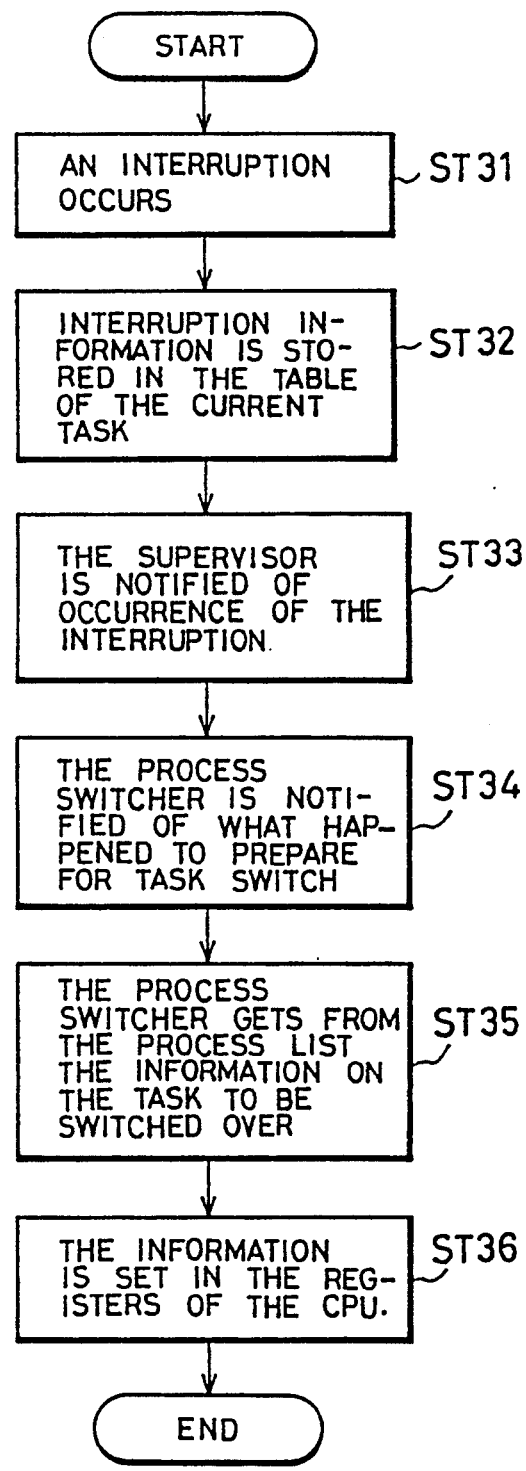

TASK TRACING APPARATUS IN A MULTITASK OPERATING SYSTEM

BACKGROUND OF THE INVENTION

1. Field of the Invention

The present invention relates to a task tracing apparatus that records a history of task execution in a multitask operating system.

2. Description of the Prior Art

FIG. 1 is a basic block diagram of a multitask operating system such as one described in "Analyzing Multitask" (2nd ed., CQ Publications Inc., Tokyo, 1988, p. 18) by S. Sasaki. In the figure, each reference numeral 1 is an application task; numeral 2 is a supervisor that manages and controls the application tasks 1; numeral 3 is a memory management unit that manages the memory area for the application tasks 1; numeral 4 is a data management unit that manages input/output data of the application tasks 1; numeral 5 is a process management unit that manages multitasking operations; and numeral 6 is an input/output management unit that manages and controls I/O devices installed in the system. The components 1 through 6 combine to form an operating system called a kernel 7.

FIG. 2 is a block diagram of a prior art process management routine which is illustrated in "Analyzing Multitask" (ibid., p. 48) and which is part of the operating system described therein. In the figure, reference numeral 2 is the supervisor which supervises external interrupt requests from the outside and system calls issued from programs; numeral 5 is a routine that manages the process; numeral 11 is a synchronization control unit for synchronizing with I/O devices; numeral 12 is a process scheduler that generates a task queue in accordance with the priorities of the tasks involved; numeral 13 is a process list that contains the tasks in the queue; and numeral 14 is a process switcher that assigns the CPU to the highest-priority task in the task queue. FIG. 3 shows a configuration of hardware that embodies the apparatus mentioned above.

What follows is a description of how a task switch takes place. There are three causes of the task switch: an externally generated interruption, all I/O synchronization interruption, and a system call. Externally generated interruptions include those from outside the system and those from outside the CPU such as a monitoring timer interruption. I/O synchronization interruptions are generated to synchronize the CPU with peripheral devices having different operation speeds, such as floppy disk drives, printers, magnetic tape units and hard disk drives. Any of these three causes, when taking place, can trigger a task switch.

FIG. 4(a) through FIG. 4(c) depict examples of the three kinds of task switching taking place as a result of their respective causes. FIG. 4(a) shows an example of how a task switch occurs in the case of an externally generated interruption. The interruption occurs while task A is being executed. This causes task B, so far in a wait state, to change into a ready state. Now both task A and task B are in a ready state. If the priority of task B is higher than that of task A, the CPU is assigned to task B. FIG. 4(b) is an example of an I/O synchronization interruption triggering a task switch. Task B, while being executed, requests a peripheral device to perform a certain process. Then task B enters a wait state and remains therein until the device completes its process. With task B in its wait state, the CPU is assigned to task A which has been in a ready state but which has been inactive because of its priority being lower than that of task B. When the peripheral device has completed its process, an I/O synchronization interruption takes place. This causes task B to change from its wait state into a ready state. Thus a task switch from task A to task B occurs. FIG. 4(c) is an example of how a system call triggers a task switch. Task A is being executed while task B is in a wait state. Then task A issues a system call that causes task B to change from its wait state into a ready state. If the priority of task B is higher than that of task A, a task switch takes place from task A to task B.

Referring now to FIG. 5, there will be described the operations carried out when a task switch is caused by an I/O synchronization interruption. In step ST1, an I/O interruption occurs. In step ST2, the occurrence of the interruption is reported via the synchronization control unit 11 to the supervisor 2 and process scheduler 12. In step ST3, the process scheduler 12 puts into a ready state a task that has waited for I/O processing, and enters the task in the process list 13. In step ST4, the supervisor 2 notifies the process switcher 14 to switch to the new task. In step ST5, the process switcher 14 gets from the process list 13 the information about the task to which a switch is to be made. In step ST6, the information is set in registers or similar storage devices means of the CPU. With the information about the new task established in this manner, the task switch takes place.

Referring now to FIG. 6, there will be described the operations performed when a task switch is triggered by a system call or by an interruption. In step ST11, a system call or an interruption takes place, calling for a task switch. In step ST12, the supervisor 2 is notified of the occurrence thereof. In step ST13, the supervisor 2 notifies the process switcher 14 of a task switch. In step ST14, the process switcher 14 gets from the process list 13 the information about the task to be switched over. In step ST15, the information is set in registers or similar storage devices of the CPU. The task switch then takes place.

Where it is necessary to develop multitask software which requires repeatedly performing the task switches described above while in operation, there are cases in which a task tracing apparatus is used to trace the history of such task switches. What follows is a description of how task tracing is carried out. The process switcher in the process management routine records task switches for task tracing purposes. These records constitute information collected only by the process switcher. The information only contains task switching from one task to another. In reference to FIG. 7, task tracing in a prior art setup takes place as follows. In step ST21, the task tracing is initiated with an operator interface device such as a CRT. In step ST22, the process switcher is notified of the task tracing being activated. Upon a task switch, in step ST23, the process switcher collects information about the task switch from which task to which task. In step ST24, the collected information is placed consecutively in a tracing buffer. In step ST25, the operator interface device requests that the contents of the tracing buffer be outputted to an appropriate output device (CRT, etc.). In step ST26, the contents of the tracing buffer are illustratively displayed on the CRT. In developing software, the software designer in charge checks if the task switches are performed as designed based on the information that is outputted in this manner.

The typical prior art task tracing apparatus operation has been described above. As can be seen, the history of task execution, i.e., the history of task switches from one task to another, is collected as trace information. The trouble is that with the prior art apparatus, it has been impossible to know which task stopped the ongoing task execution for what reason, and which task resumed it and why. Given these unknown factors, it has taken many hours to find out the cause of an unexpected task switch. This has resulted in the need to take an inordinate amount of time to develop multitask systems.

SUMMARY OF THE INVENTION

It is therefore the primary object of the present invention to provide a task tracing apparatus capable of collecting a history of interruptions and system calls triggering task switches.

The above and other objects of the invention are attained as follows. In an apparatus incorporating an operating system that controls task execution, each task is provided with a table for storing interruption information and system call information. The interruption information comprises causes of interruptions triggering task switches. The system call information comprises system call numbers given when system calls are issued. When an interruption takes place or a system call is issued, the relevant information is stored in the table. When task tracing is started so as to record the history of task execution, both the interruption information and the system call information, along with task switch information, are outputted.

The above and other related objects and features of the invention, as well as the novelty thereof, will clearly appear from the following description and from the accompanying drawings. It is to be expressly understood, however, that the drawings are for purposes of illustration only and are not intended as a definition of the limits of the invention.

BRIEF DESCRIPTION OF THE DRAWINGS

FIG. 4(a) through FIG. 4(c) are diagrams explaining task switches in prior art arrangements;

FIG. 7 is a flowchart depicting the flow of task switch operations carried out during prior art task tracing;

FIG. 9 is a flowchart showing the flow of operations performed by the preferred embodiment when an interruption occurs or a system call is issued.

PREFERRED EMBODIMENTS OF THE INVENTION

Figure 1:
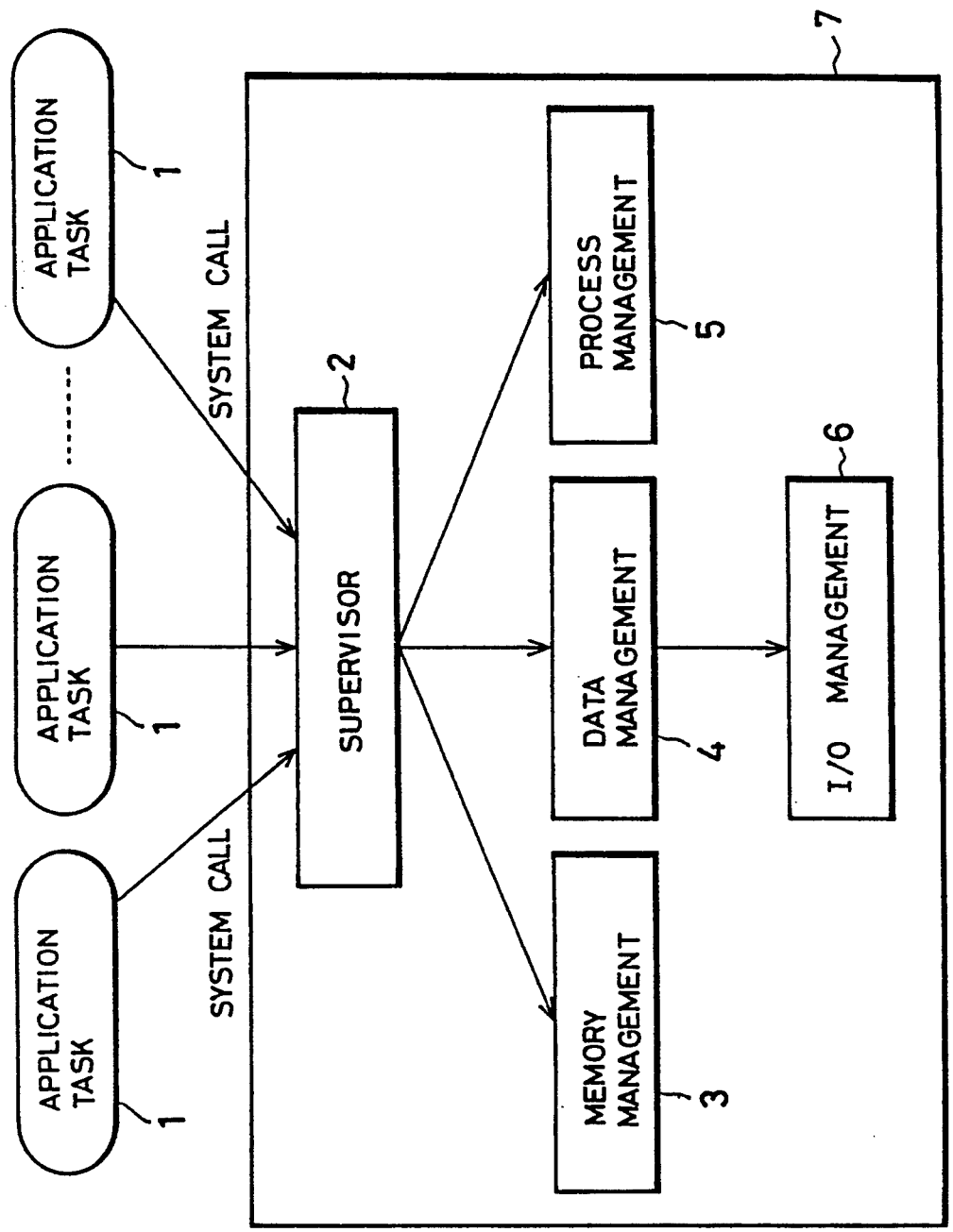
FIG. 1 is a basic block diagram of a multitask operating system that applies both to prior art apparatus and to the present invention.
Figure 2:
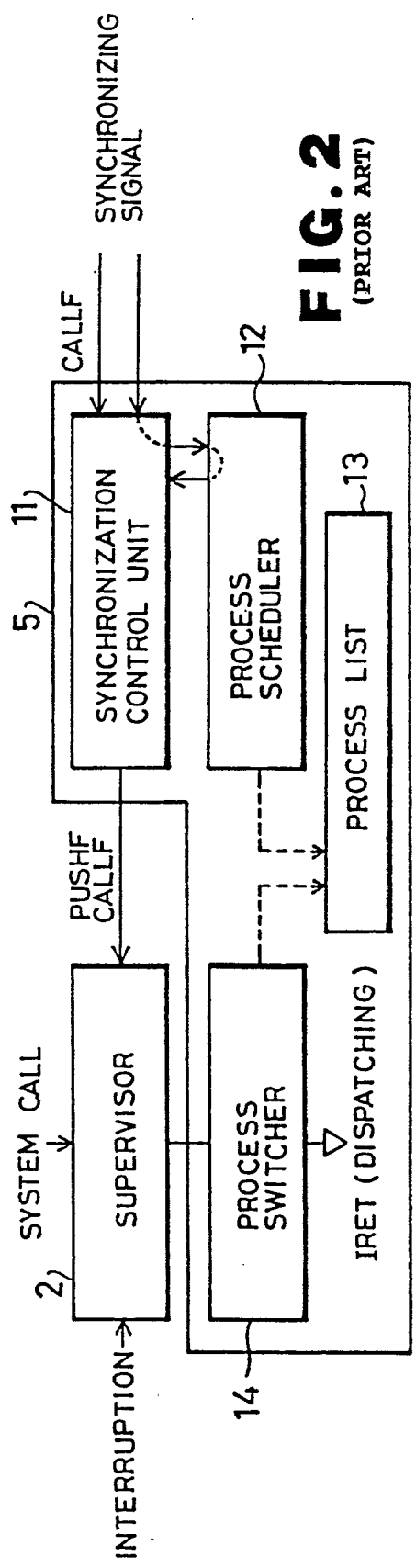
FIG. 2 is a block diagram of a prior art process management routine.
Figure 3:
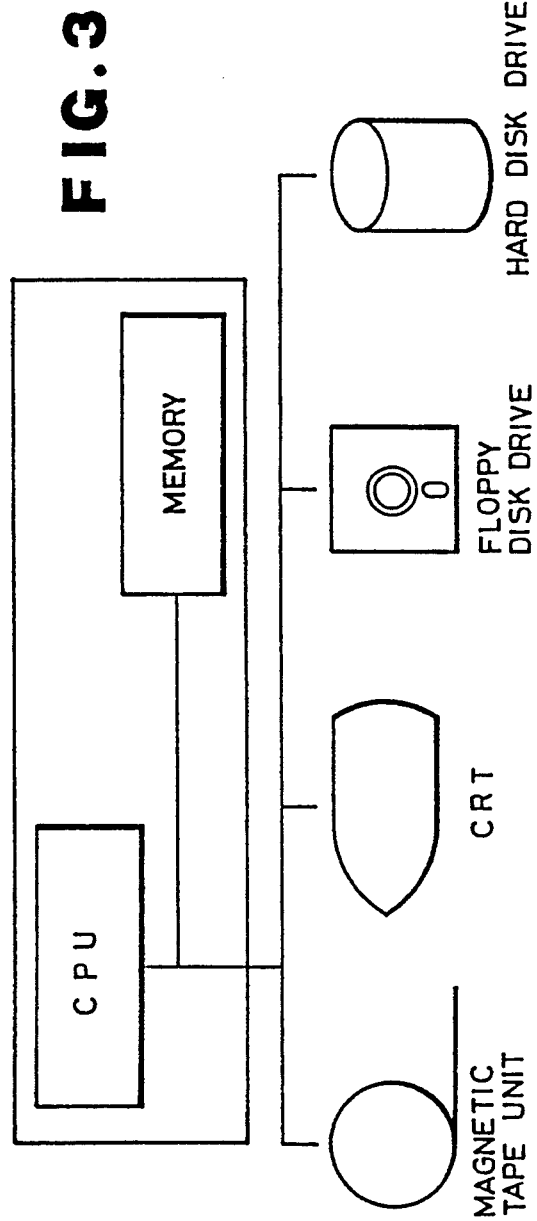
FIG. 3 is a block diagram of hardware that applies both to prior art apparatus and to the present invention.
Figure 5:
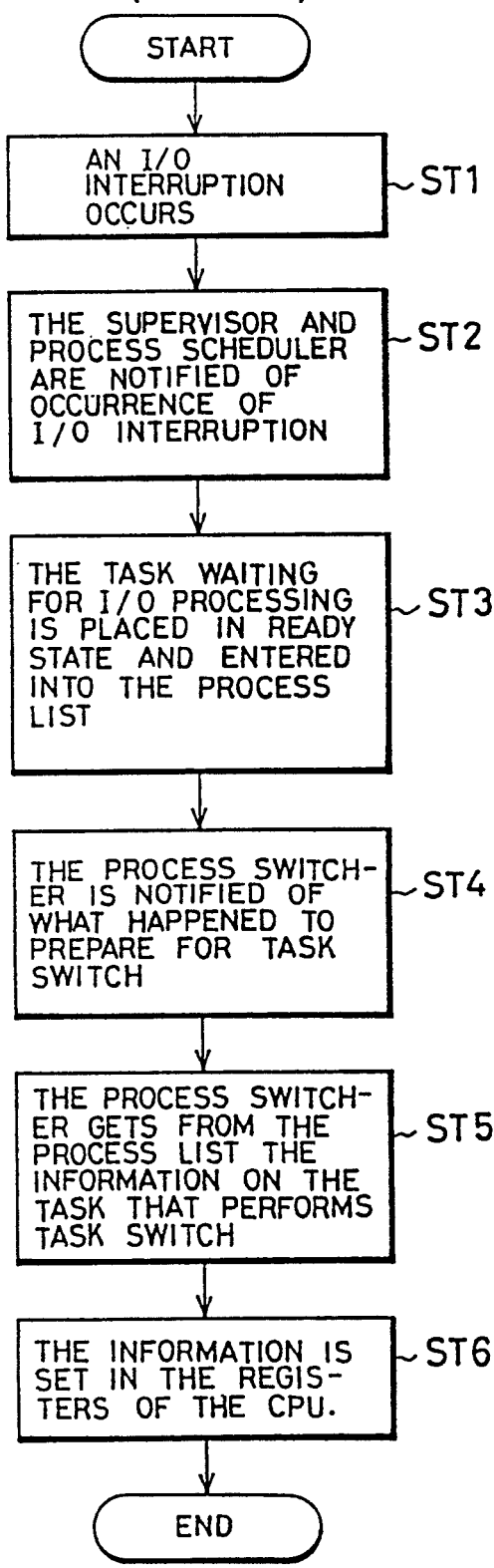
FIG. 5 is a flowchart showing the flow of task switch operations carried out when an I/O interruption takes place in a prior art setup.
Figure 6:
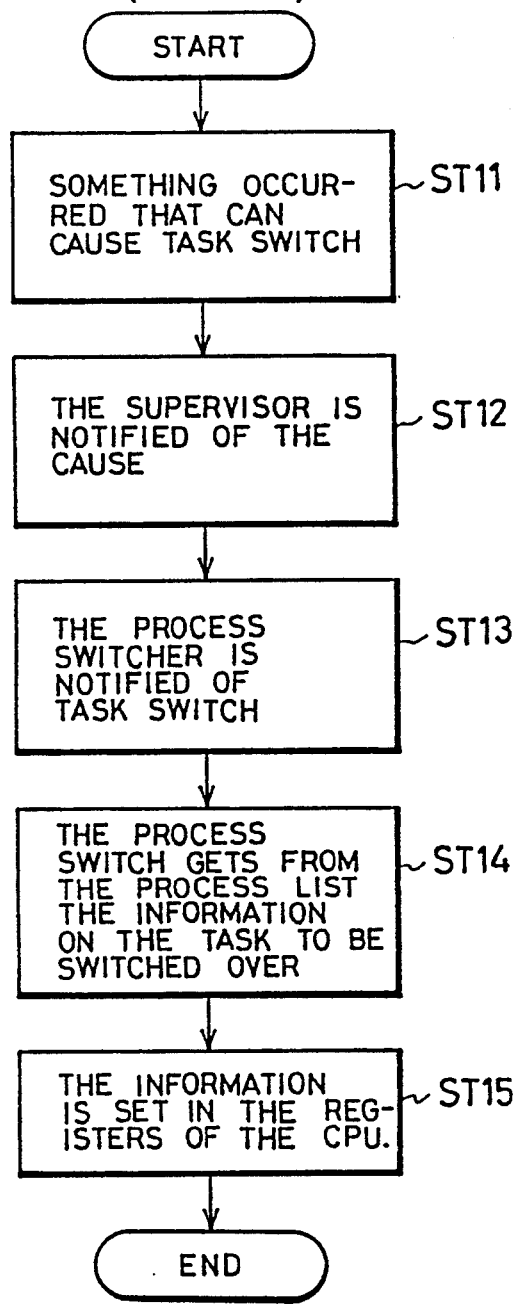
FIG. 6 is a flowchart indicating the flow of task switch operations performed when an interruption occurs or a system call is issued in a prior art setup.
Figure 8:
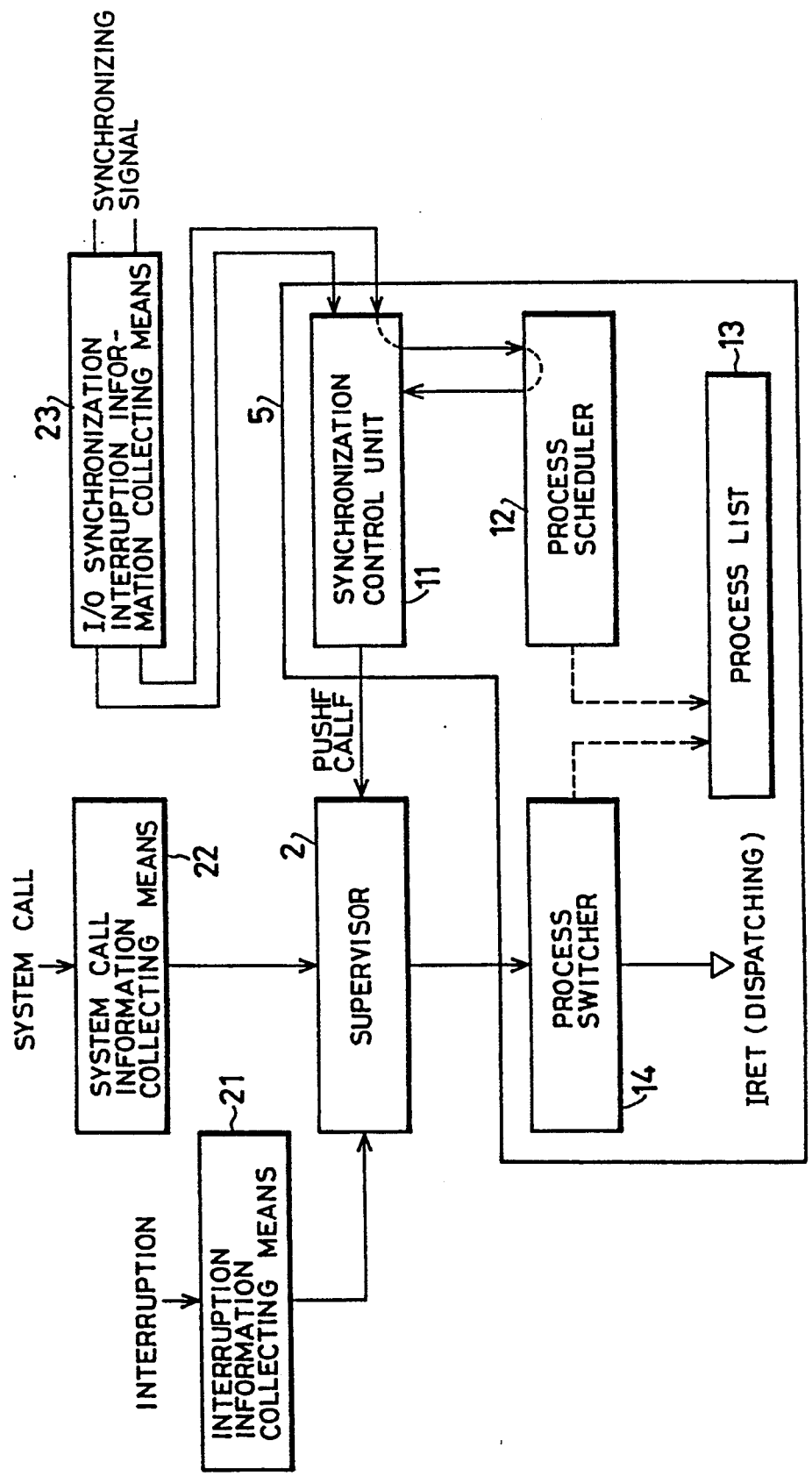
FIG. 8 is a block diagram of a task tracing apparatus which is a preferred embodiment of the present invention.

The preferred embodiment of the present invention will now be described by referring to the accompanying figures. In FIG. 8, reference numeral 21 is an interruption information collecting means for collecting information about the cause of each interruption when it occurs; numeral 22 is a system call information collecting means for collecting the number of each system call when it takes place; and numeral 23 is an I/O synchronization interruption information collecting means for collecting information about which of I/O devices are requested for by an I/O synchronization interruption. A table for each task for storing the three kinds of information is allocated in memory. The remaining elements of FIG. 8 are identical to the similarly numbered elements of FIG. 2 and will not be further explained.

FIG. 9 is a flowchart showing operations when a task switch occurs. It is assumed that the task switch depicted therein is caused by an interruption. In step ST31, an interruption occurs. In step ST32, interruption information in effect at the time is stored in the table for the task being currently executed. In step ST33, the occurrence of the interruption is reported to the supervisor 2.

In step ST34, the process switcher 14 is notified of interruption occurrence by the supervisor 2 to make a switch to a new task. In step ST35, the process switcher 14 gets from the process list 13 the information about the task to be switched over to. In step ST36, the information is set in registers or similar storage devices of the CPU, In the case of a system call or an I/O synchronization interruption, relevant information is likewise collected and placed in the table for the ongoing task.

Figure 10:
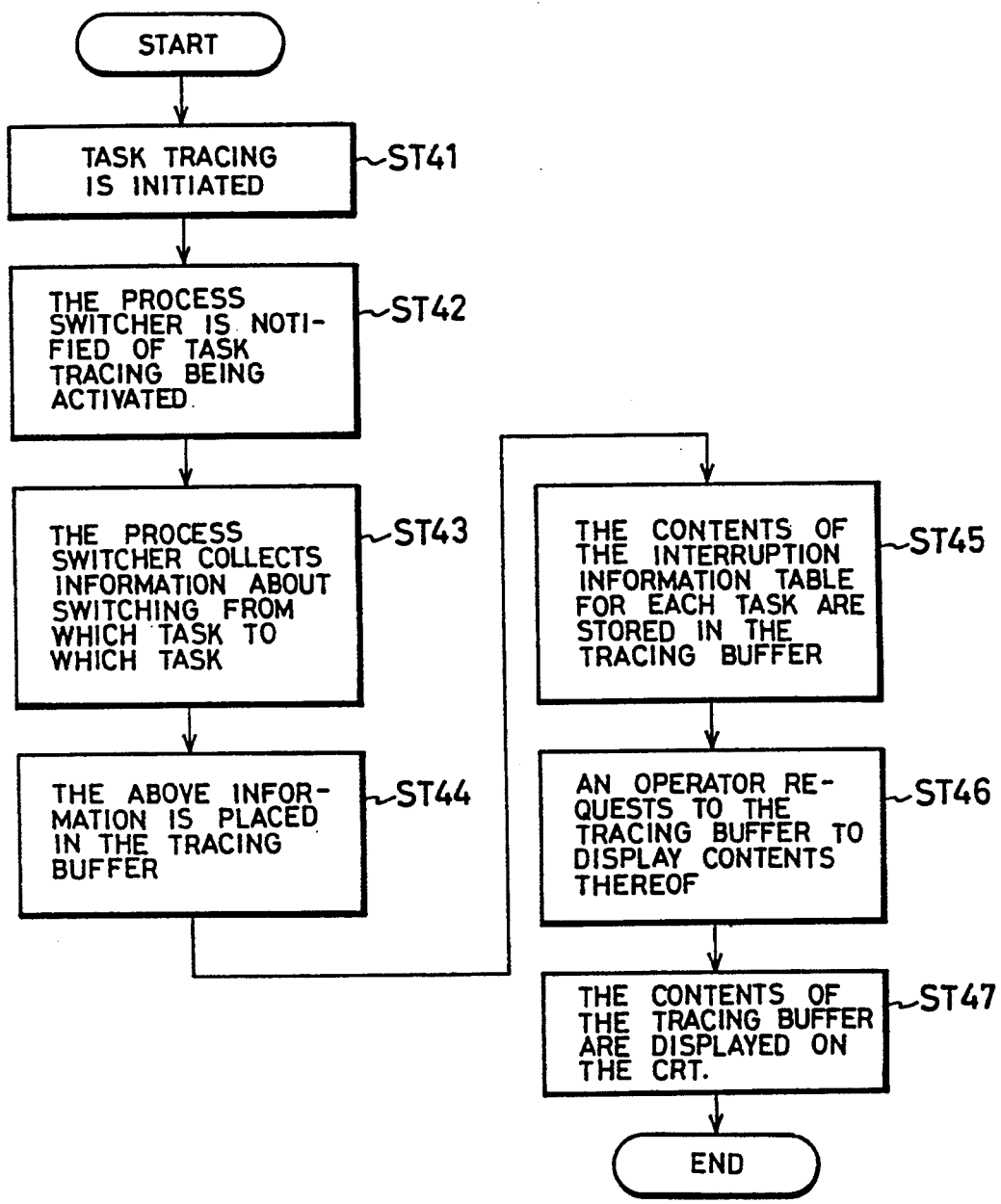
FIG. 10 is a flowchart indicating the flow of operations carried out by the preferred embodiment when a task switch takes place during task tracing.

There will now be described operations during task tracing by referring to a flowchart of FIG. 10. In step ST41, task tracing is initiated with an operator interface device such as a CRT. In step ST42, the process switcher 14 is notified of the task tracing being activated. In step ST43, the process switcher 14 collects information about switching from which task to which task. In step ST44, the information thus collected is stored consecutively in a tracing buffer. In step ST45, the interruption information and system call information in the table for each task are written into the tracing buffer. In step ST46, the operator interface device requests to the tracing buffer to output the contents thereof to an appropriate output device (CRT, etc.). In step ST47, the contents of the tracing buffer are illustratively displayed on the CRT.

In the above-described embodiment, the number of each system call is collected as system call information. Alternatively, the same results are obtained by collecting parameters applicable to each system call, the address of an application task in effect when a system call is issued, and/or the address of an application task in effect when an interruption is generated.

As indicated above, according to the invention, an apparatus incorporating an operating system that controls task execution is provided with a means for storing information about the causes of interruptions triggering task switches (interruption information) and information comprising the numbers of system calls issued (system call information), at a point of time when a system call is issued or an interruption is generated. When task tracing is initiated in order to record a history of task execution, both the interruption information and the system call information, along with task switch information, are outputted. This makes it possible to obtain not only the history of task switch execution but also the history of interruptions and system calls which trigger task switches. The information readily pinpoints the cause of a given task switch, thereby allowing software designers to develop multitask software with ease.

What is claimed is:

1. In a multitask operating system which controls execution of a plurality of tasks and switches execution from one of said plurality of tasks to another of said plurality of tasks, a task tracing apparatus, comprising:

task switch information storage means for storing task switch information which identifies a switch by said operating system from execution of one of said plurality of tasks to execution of another of said plurality of tasks by identifying the task being executed before the switch and the task being executed after the switch;

means for collecting interrupt information identifying sources of interrupts to said system which trigger task switches from execution of one of said plurality of tasks to execution of another of said plurality of tasks for which task switch information is stored in said task switch information storage means;

means for collecting system call information identifying system call numbers of system calls issued by said system which trigger task switches from execution of one of said plurality of tasks to execution of another of said plurality of tasks for which task switch information is stored in said task switch information storage means;

means for storing said interrupt information and said system call information collected by said respective means for collecting; and means, operatively coupled to said task switch information storage means and said means for storing, for outputting information stored in said task switch information storage means and said means for storing during execution of a task tracing task by said system.

2. In a multitask operating system, a task tracing apparatus according to claim 1, wherein said interrupt information comprises externally generated interrupt information and I/O synchronization interrupt information.

3. In a multitask operating system, a task tracing apparatus according to claim 2, wherein said means for storing comprises a table allocated in a memory of said system for each of said plurality of tasks, interrupt information and system call information triggering a task switch being stored in the table for the task being switched from, and I/O synchronization interrupt information and system call information also being stored in the table for the task being switched over to.

* * * * *

UNITED STATES PATENT AND TRADEMARK OFFICE
CERTIFICATE OF CORRECTION

PATENT NO. : 5,379,427
DATED : January 3, 1995
INVENTOR(S) : Ikuyoshi Hiroshima

It is certified that error appears in the above-indentified patent and that said Letters Patent is hereby corrected as shown below:

Col. 1, line 12, delete "one"; Col. 1, line 31, delete "from the outside"; Col. 4, lines 29-30, delete the paragraph break between the two lines; Col. 4, line 36, "CPU," should be -- CPU. --; Col. 4, line 51, delete "to" (first occurrence).

Signed and Sealed this

Twenty-first Day of March, 1995

Attest:

BRUCE LEHMAN

Attesting Officer     Commissioner of Patents and Trademarks